Sept. 27, 1938.  C. W. DIECKMANN  2,131,429
MEAT CUTTER
Filed Nov. 11, 1936
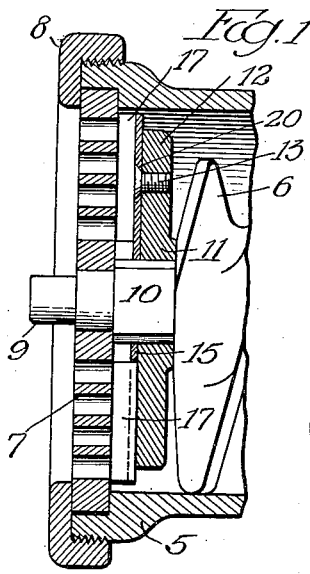
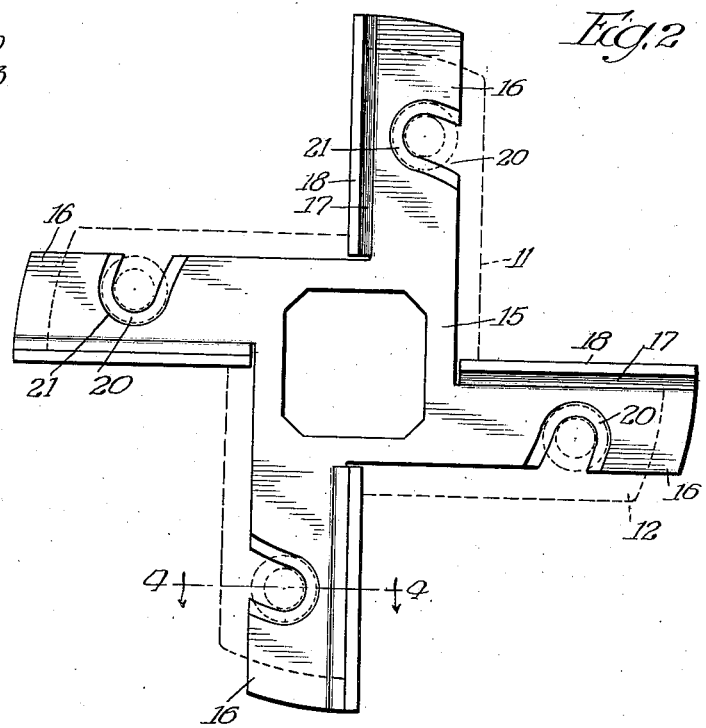
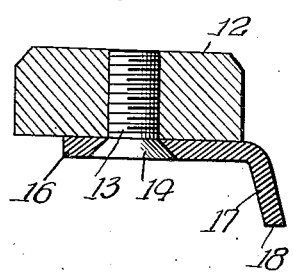
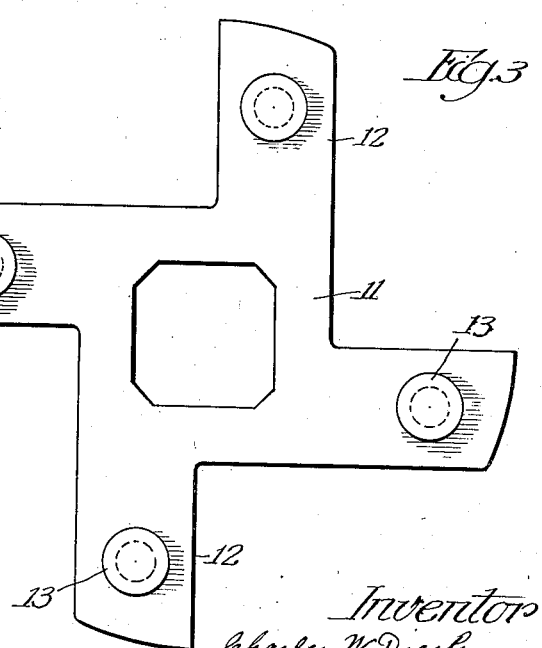
Inventor
Charles W. Dieckmann
By Fred Gerlach his Atty Patented Sept. 27, 1938

2,131,429

UNITED STATES PATENT OFFICE 2,131,429

MEAT CUTTER

Charles W. Dieckmann, Chicago, Ill.

Application November 11, 1936, Serial No. 110,231

1 Claim. (Cl. 146—189)

The invention relates to rotary meat cutters or knives.

The object of the invention is to provide a rotary knife or cutter which consists of a stamped metal plate having integral blades with cutting flanges bent obliquely from the plane of the blades with means for effectively securing the blade to the spider, which makes it possible to use the knife until the cutting flanges are worn down to the plane of the knife blades and which permits the knife and the spider to be quickly and readily connected and disconnected.

Other objects of the invention will appear from the detailed description.

The invention consists in the several novel features which are hereinafter set forth and are more particularly defined by the claim at the conclusion hereof.

In the drawing:

Fig. 1 is a fragmentary longitudinal section of a meat cutter embodying the invention. Fig. 2 is a side elevation of the rotary knife. Fig. 3 is a side elevation of the spider on which the cutter is removably secured. Fig. 4 is a section on line 4—4 of Fig. 2 with the knife attached to the blade.

The invention is exemplified in a machine comprising a cylindrical body 5, a feed-screw 6 rotatable in the body and adapted to be driven by any suitable means. A perforated plate 7 is held in the discharge end of the body 5 by a screw-collar 8. A spindle 9 on the feed-screw 6 extends through plate 7 and is provided between the plate and the outer end of the screw with a polygonal portion 10 on which the rotary knife is carried and by which the knife is driven. These parts may be of conventional construction.

The knife is carried by a spider which comprises a hub 11 having an opening therein to fit around the polygonal portion 10 of the spindle 9 and four arms 12 extending radially outward from the hub. Each arm 12 has fixed therein a stud 13 which has a flared head 14 projecting from the face of the spider against which the knife fits. The knife is stamped from a plate of metal and consists of a hub 15 of a single thickness of the plate and radially extending blades or arms 16 adapted to overlie and fit against the contiguous face of the spider. The arms 16 and hub 15 are in the plane of the plate from which the knife is formed. One of the radial marginal portions of each of the knife-blades 16 is bent obliquely to the plane of the hub 15 and arms 16 to form radially extending flanges adapted to engage the inner face of the perforated plate 7 for cutting or grinding the meat. The outer edges 18 of the flanges 17 are ground so they will be parallel to the plane of the plate 7. Each blade 16 of the knife has cut therein a countersunk arcuate slot 20 which extends circumferentially from and is open at the rear edge of the arm and has a semi-annular end 21. These slots are adapted to register with and to receive the studs 13. The wall of each slot is flared to conform to the flare on the head 14 of a stud 13. The stud-head 14 does not exceed in thickness the arms 16 or the plate from which the knife is stamped, so that the outer faces of the heads 14 will be substantially flush with and will not project beyond the outer face of the knife-blades where they travel freely in the meat behind the knife. The knife is connected to the spider by placing the knife against the spider and by rotating the knife relatively to the spider so the undercut heads 14 on the spider-arms 12 pass into the open ends of the flared slots 20 and are seated in the semi-annular inner ends 21 of the slots. By reverse rotation, the knife may be readily separated or disconnected from the spider for convenience in grinding the cutting-edges of the knife or replacing it. The shanks of studs 13 may be fixedly secured in the spider by screw threads or may be pressed into holes in the spider.

In use, the flanges 17 are subjected to wear from contact with the inner face of perforated plate 7. In some instances, it becomes necessary to sharpen the cutting-edges by grinding. An important characteristic of the construction set forth is that the knife remains usable and operative until the flanges 17 have been worn or ground away to the plane of the outer face of the plate. This increases the life of the knife and is made possible by using devices which connect the knife to the spider and lie within the plane of the outer face of the arms and hub of the knife. Another characteristic of the construction described is that the countersunk slots and undercut heads of the studs 13 cause the knife to be wedged against the outer face of the spider, securely, and positioned concentrically on the spider and held in a true transverse plane so that the cutting-edges of the knife will rotate in the plane of the plate 7 and be uniformly worn. The studs 13 may be fixedly secured in the spider since it is not necessary to adjust or remove them in connecting or disconnecting the spider and the knife.

The invention is not to be understood as restricted to the details set forth, since these may be modified within the scope of the appended claim, without departing from the spirit and scope of the invention.

Having thus described the invention, what I claim as new and desire to secure by Letters Patent is:

A cutter for a meat grinder comprising a spider having a hub adapted to be driven by and mounted on a shaft, flared heads fixed on and projecting from one face of the spider, a knife fitting against one face of the spider, formed of a stamped plate of metal and comprising an integral hub and a series of radial arms, each arm having a flange projecting laterally therefrom with its outer end forming a radial cutting edge at the front of the arm, the arms having countersunk slots with inclined edges open at and extending inwardly from the rear edges and terminating rearwardly of the flanges, the flared heads and inclined edges of the slots forming, by relative rotation of the spider and knife, an interlocking and wedging connection for securing the knife and the spider together against axial separation and by their wedge action forcing the arms against the spider when pressure is exerted against the flanges by the material being ground, the outer ends of the heads being disposed within the slots so that the flanges will be useable for cutting until they have been removed to the plane of the outer face of the arms.

CHARLES W. DIECKMANN.